Nov. 16, 1954    C. E. ANDERSHOCK    2,694,430
LOCK NUT
Filed July 9, 1953
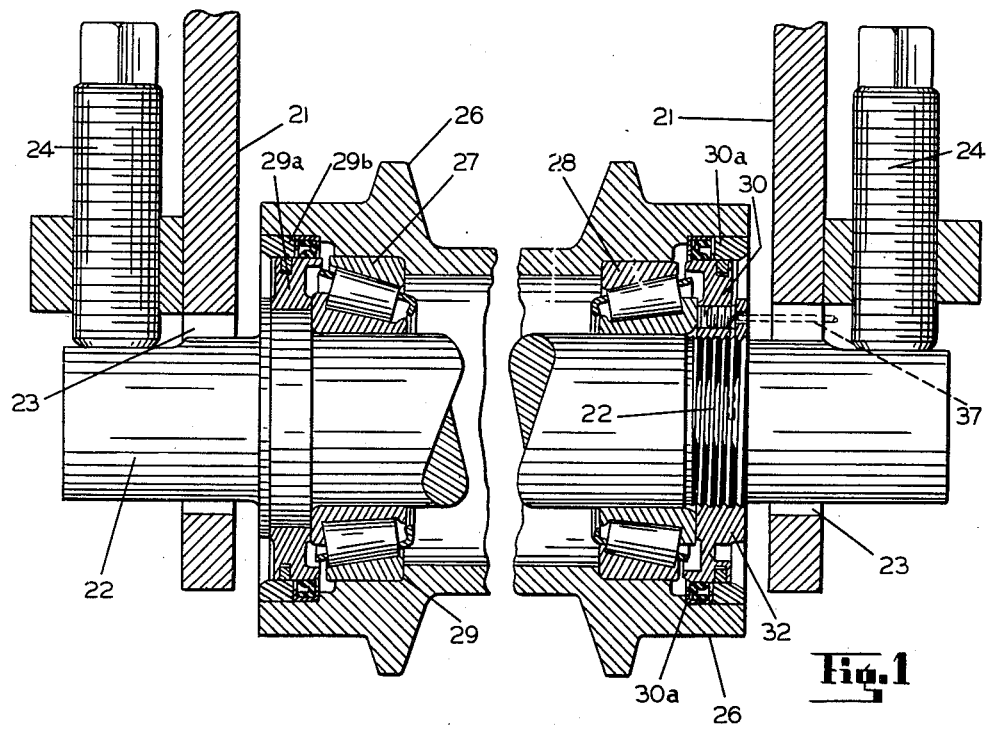
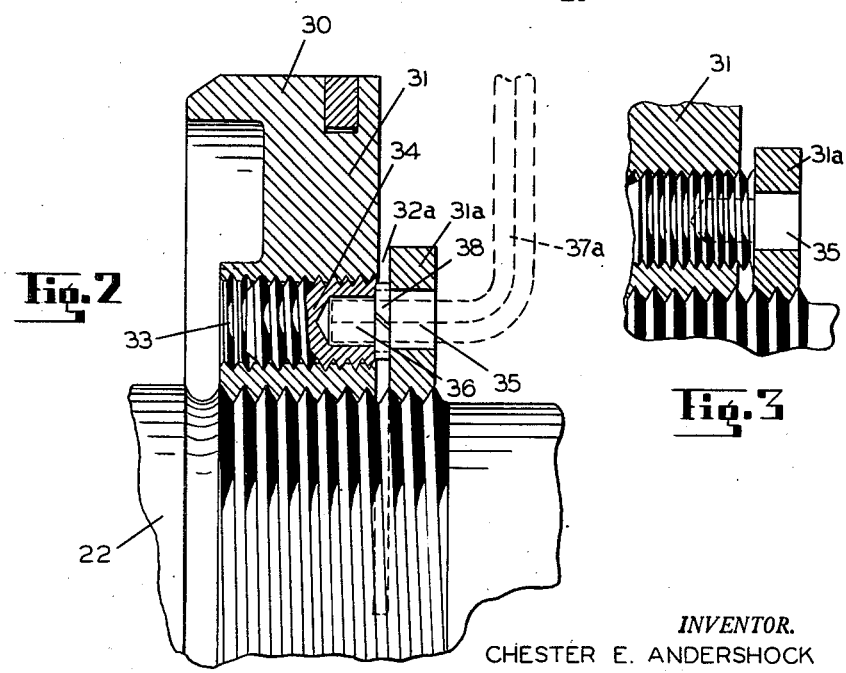
INVENTOR.
CHESTER E. ANDERSHOCK
BY
Murray A. Gleeson
ATTORNEY

United States Patent Office 2,694,430
Patented Nov. 16, 1954

2,694,430
LOCK NUT

Chester E. Andershock, Chicago, Ill., assignor to Goodman Manufacturing Company, Chicago, Ill., a corporation of Illinois Application July 9, 1953, Serial No. 366,934

2 Claims. (Cl. 151—21)

This invention relates to improvements in lock nuts especially adapted for use in relatively inaccessible parts of mechanical assemblies, and has for its principal object to provide a simple, inexpensive form of lock nut for such uses.

The invention may best be understood by reference to the accompanying drawing, in which:

Figure 1 is an axial section of a sprocket assembly used in an endless track vehicle, comprising an illustrative application of my invention;

Figure 2 is an enlarged fragmentary detail section showing the parts of the lock nut used in the sprocket assembly of Figure 1;

Figure 3 is a fragmentary detail section showing a variant form of the invention.

Referring to the embodiment of my invention shown in the drawing, 21, 21 indicate a pair of laterally spaced vertical side plates of an endless tread vehicle on which is mounted a chain sprocket assembly including an idler shaft 22 having chain-tensioning adjustment in horizontal slots 23, 23 in the side plates, controlled as usual by tensioning screws 24, 24.

A chain sprocket 26 is journalled on shaft 22 by a pair of roller bearing units 27, 28 of conventional form. The sprocket is initially assembled on the shaft by engaging the inner race of one bearing unit 27 with a shoulder 29, with the adjacent end of the sprocket enclosed by a suitable end ring 29a and sealing ring 29b. The opposite end of the sprocket is enclosed by a locking collar 30 and seal 30a. The locking collar is threaded on the shaft 22, and the roller bearing units 27 and 28 are pretensioned by screwing the locking collar inwardly to compress the inner race of bearing unit 28 to the proper position longitudinally of the shaft.

Referring now more particularly to the lock nut feature, which forms the subject of my invention, Figure 2 shows in enlarged form the locking collar 30. Said ring is formed with a main body 31 and an outer end portion 32 of reduced diameter. The reduced portion 32 has a narrow kerf 32a cut transversely thereof, partially severing said portion from the main body 31 of the collar, in the illustrative form shown said kerf extending approximately half way through said reduced end portion 32. As a result, a relatively flexible plate 31a is formed from the end portion in spaced relation to the main body 31 of the collar, but having a threaded bore forming a continuation of the threaded bore of the main body 31.

At one or more points in the main body 31 opposite the plate 31a is formed a threaded bore 33 for receiving a set screw 34. The illustrative form of set screw shown is of the conventional "Allen" type. The plate 31a is provided with a bore 35 therethrough, registering with the bore 33, but preferably slightly smaller diameter than the latter. The bore 35 is of sufficient size to permit access to a squared socket 36 in the outer end of the set screw 34 by the end of a suitable tool, such as a squared straight-shanked wrench, as indicated in dotted lines at 37 in Figure 1, or a squared right-angled wrench, as indicated in dotted lines at 37a in Figure 2.

A spring washer 38 is preferably, but not necessarily, employed between the outer end of the set screw 34 and the inner face of the plate 31a. In order to keep the parts in position for ready assembly, the spring washer 38 is preferably of greater thickness than the normal width of the kerf 32a and of slightly less diameter than the bore 33 in which the set screw 34 is threaded, as shown in Figure 2. The inner diameter of the washer should, of course, be sufficient to permit the end of the wrench to pass through it. The bore 33 must necessarily pass all the way through the body 31 to permit the set screw to be inserted from the inner side of said body, prior to assembly.

The use and operation of the device shown in Figures 1 and 2 is as follows:

The locking collar 30 is screwed on the shaft to the desired position, the set screw 34 having been previously inserted in the bore 33, with its outer end holding the spring washer 38 lightly in place against the inner face of plate 31a, substantially as shown in Figure 2. The device is then locked in place by inserting the end of the tool 37 (or 37a) through the bore 35 and the washer, to engage the set screw 34 and back it out toward the plate 31a. This causes the plate to flex away from the body 31, to frictionally grip the threads on the shaft in a tight and effective manner.

Figure 3 shows a variant form of the invention, wherein the spring washer is omitted and instead the outer end of the set screw 34 is backed outwardly into direct engagement with the plate 31a around the bore 35. In other respects, the construction and operation of this variant form is the same as described in connection with the form shown in Figures 1 and 2.

One of the principal advantages of the device is that the parts will remain together even though the set screw is loosened, and until said screw is entirely removed from the inner end of its bore 33.

It will be observed further that all the moving parts of the locking device are compactly disposed below the end surface of the locking collar where they are protected from damage or accidental displacement, both before and after assembly. The set screw is readily accessible for locking or unlocking by a wrench of the proper shape, even in extremely close quarters.

Although I have shown and described certain embodiments of my invention, it will be understood that I do not wish to be limited to the exact construction shown and described, but that various changes and modifications may be made without departing from the spirit and scope of the invention as defined in the appended claims.

I claim:

1. In a lock nut, a main body and an integral end portion having an axially threaded bore extending therethrough, a part of said end portion being spaced from the end of said main body by a transverse kerf to form a relatively flexible plate portion, said main body having a threaded set screw bore extending therethrough parallel with its axially threaded bore, and the spaced part of said end portion having a tool access aperture registering with, but of smaller diameter than, said set screw bore.

2. A lock nut in accordance with claim 1, having a set screw threaded in the set screw bore, a tool-engaging recess at its outer end, and a washer adapted to engage the outer end of said set screw, said washer being of greater thickness than the kerf, of smaller diameter than the set screw bore, and of greater diameter than the tool-access aperture, whereby said washer is adapted to be retained in said set screw bore by the spaced part of said end portion when said set screw is threaded in its bore.

References Cited in the file of this patent

UNITED STATES PATENTS

| Number | Name | Date |
| --- | --- | --- |
| 518,474 | Wallace | Apr. 17, 1894 |
| 928,436 | Fifield | July 20, 1909 |
| 1,621,227 | Wetmore | Mar. 15, 1927 |

FOREIGN PATENTS

| Number | Country | Date |
| --- | --- | --- |
| 124,594 | Austria | Sept. 25, 1931 |